United States Patent
Yoshimura et al.

(10) Patent No.: US 11,849,302 B2
(45) Date of Patent: Dec. 19, 2023

(54) OUTPUT CONTROL DEVICE, OUTPUT CONTROL SYSTEM, AND CONTROL METHOD

(71) Applicant: TOYOTA BOSHOKU KABUSHIKI KAISHA, Aichi-ken (JP)

(72) Inventors: Ryogo Yoshimura, Aichi-ken (JP); Ryo Kodama, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 133 days.

(21) Appl. No.: 17/565,611

(22) Filed: Dec. 30, 2021

(65) Prior Publication Data

US 2022/0232339 A1 Jul. 21, 2022

(30) Foreign Application Priority Data

Jan. 15, 2021 (JP) .................................. 2021-005317

(51) Int. Cl.
| | |
|---|---|
| *H04S 7/00* | (2006.01) |
| *H04R 5/04* | (2006.01) |
| *G06T 19/00* | (2011.01) |
| *G01B 11/00* | (2006.01) |
| *G01B 21/00* | (2006.01) |
| *G01S 17/06* | (2006.01) |
| *G01S 19/14* | (2010.01) |
| *G09F 9/30* | (2006.01) |

(52) U.S. Cl.
CPC ............. *H04S 7/303* (2013.01); *H04R 5/04* (2013.01); *H04S 2400/01* (2013.01); *H04S 2400/11* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 2009/0262946 | A1* | 10/2009 | Dunko | G06F 3/165 381/17 |
| 2012/0212613 | A1* | 8/2012 | Yamaguchi | B60R 1/00 348/148 |
| 2013/0096820 | A1* | 4/2013 | Agnew | B60R 1/00 701/428 |

(Continued)

FOREIGN PATENT DOCUMENTS

JP 2015-16787 1/2015

*Primary Examiner* — Qin Zhu
(74) *Attorney, Agent, or Firm* — Greenblum & Bernstein, P.L.C.

(57) ABSTRACT

To provide a realistic video and audio to a passenger of a moving body, an output control device includes: a position and orientation identifying section which identifies a real position and a real orientation; a reading section which reads virtual space data; a virtual position determining section which determines a virtual position and a real orientation according to the real position and the real orientation; a display control section which controls a display to display, based on the virtual position, the virtual orientation, and a position where the display (4) is provided, an image of a partial region or a part of an object in a virtual space; and an audio output control section which controls, based on the virtual orientation and a positional relationship between the virtual position and an audio source object, a position of a stereo image formed by audio outputted from a speaker.

10 Claims, 8 Drawing Sheets

(56) References Cited

U.S. PATENT DOCUMENTS

| | | | |
|---|---|---|---|
| 2013/0181901 A1* | 7/2013 | West | H04N 9/3147 |
| | | | 345/1.3 |
| 2015/0097860 A1* | 4/2015 | Alaniz | G06T 11/60 |
| | | | 345/633 |
| 2017/0295446 A1* | 10/2017 | Thagadur Shivappa | G06F 3/16 |
| 2018/0352360 A1* | 12/2018 | Chen | G06F 3/165 |
| 2020/0196086 A1* | 6/2020 | Swaminathan | H04S 7/302 |

* cited by examiner

OUTPUT CONTROL DEVICE, OUTPUT CONTROL SYSTEM, AND CONTROL METHOD

This Nonprovisional application claims priority under 35 U.S.C. § 119 on Patent Application No. 2021-005317 filed in Japan on Jan. 15, 2021, the entire contents of which are hereby incorporated by reference.

TECHNICAL FIELD

The present disclosure relates to an output control device, an output control system, and a control method.

BACKGROUND ART

There has been a technology of controlling an output of audio from a speaker so as to localize a sound formed by the audio, that is, control a position of a "stereo image".

CITATION LIST

Patent Literature

[Patent Literature 1]
Japanese Patent Application Publication Tokukai No. 2015-16787

SUMMARY OF INVENTION

Technical Problem

In recent years, there has been a demand for technologies for providing a user with a more realistic visual and audio experience in augmented reality (AR), mixed reality (MR), or the like.

An objective of an aspect of the present disclosure is to provide a realistic video and audio to a passenger of a moving body.

Solution to Problem

In order to attain the objective, an output control device in accordance with an aspect of the present disclosure is an output control device for controlling a display and a speaker which are provided in an inner space of a moving body includes: a position and orientation identifying section configured to identify (i) a real position of the moving body, the real position being a position in a real space, and (ii) an orientation of the moving body in the real space; a reading section configured to read, from a storage device, virtual space data defining a virtual space in which an audio source object is provided in a three-dimensional map, the audio source object being a three-dimensional object that serves as a virtual audio source; a virtual position determining section configured to determine, in accordance with the real position of the moving body and the orientation of the moving body in the real space, (i) a virtual position of the moving body, the virtual position being a position in the virtual space, and (ii) an orientation of the moving body in the virtual space; a display control section configured to control the display to display, on the basis of (i) the virtual position of the moving body, (ii) the orientation of the moving body in the virtual space, and (iii) a position at which the display is provided, an image of a partial region of the virtual space or an image of a part of an object in the virtual space; and an audio output control section configured to control the speaker to output audio, the audio output control section controlling, on the basis of (i) the orientation of the moving body in the virtual space and (ii) a relative positional relationship between the virtual position of the moving body and the audio source object, a position of a stereo image formed by the audio outputted from the speaker.

In order to attain the objective, a control method in accordance with an aspect of the present disclosure is a control method for controlling a display and a speaker which are provided in an inner space of a moving body, the method including: a position and orientation identifying step of identifying (i) a real position of the moving body, the real position being a position in a real space, and (ii) an orientation of the moving body in the real space; a reading step of reading, from a storage device, virtual space data defining a virtual space in which an audio source object is provided in a three-dimensional map, the audio source object being a three-dimensional object that serves as a virtual audio source; a virtual position determining step of determining, in accordance with the real position of the moving body and the orientation of the moving body in the real space, (i) a virtual position of the moving body, the virtual position being a position in the virtual space, and (ii) an orientation of the moving body in the virtual space; a display control step of controlling the display to display, on the basis of (i) the virtual position of the moving body, (ii) the orientation of the moving body in the virtual space, and (iii) a position at which the display is provided, an image of a partial region of the virtual space or an image of a part of an object in the virtual space; and an audio output control step of controlling the speaker to output audio, the audio output control step including controlling, on the basis of (i) the orientation of the moving body in the virtual space and (ii) a relative positional relationship between the virtual position of the moving body and the audio source object, a position of a stereo image formed by the audio outputted from the speaker.

With the above configuration and the above process, it is possible to determine a position and an orientation of the moving body in the virtual space in accordance with a position and an orientation of the moving body in the real space. Further, it is possible to cause the display to display an image in accordance with the position and the orientation of the moving body in the virtual space. Further, in a case where the audio source object provided in the virtual space is considered to be a virtual audio source, it is possible to cause a stereo image of audio corresponding to the audio source object to be formed in a position in accordance with a positional relationship between the movable body and the audio source object and relative directions of the moving body and the audio source object in the virtual space.

This enables a passenger of the moving body, which is present in the real space, to have an experience as if the audio source object, which is essentially a virtual audio source, is an audio source that is actually present and is uttering a sound. That is, it is possible to provide a realistic video and audio to the passenger of the moving body.

The output control device can be configured such that: the position and orientation identifying section periodically updates the real position of the moving body and the orientation of the moving body in the real space; the virtual position determining section updates, in accordance with the real position and the orientation in the real space thus updated, the virtual position and the orientation in the virtual space; the display control section controls the display to display the image of the partial region and the image of the part of the object, each of which has been updated on the basis of the virtual position and the orientation in the virtual space thus updated; and the audio output control section updates the position of the stereo image on the basis of the virtual position and the orientation in the virtual space thus updated.

With the above configuration, in a case where the real position and the real orientation of the moving body have changed, the output control device can identify the real position and the orientation in the real space which have changed. The virtual position of the moving body and the orientation of the moving body in the virtual space are determined in accordance with the real position and the orientation in the real space. A position of an image of a region to be displayed on the display or an image of an object to be displayed on the display and a position of a stereo image formed by audio outputted by the speaker are determined in accordance with the virtual position of the moving body and the orientation of the moving body in the virtual space.

As such, with the above configuration, in a case where the real position and the real orientation of the moving body have changed, it is possible to reflect such changes in image display and audio output.

The output control device can be configured such that the audio output control section controls the speaker so that the greater a distance between the virtual position and the audio source object in the virtual space, the smaller a volume in which audio corresponding to the audio source object is outputted.

The above configuration enables a positional relationship between the moving body and an audio source object to be represented by a volume of a sound. This enables a passenger of the moving body to experience more realistic audio.

The output control device can be configured such that: the virtual position determining section determines the virtual position so that a positional relationship between a given reference point in the virtual space and the virtual position is similar to a positional relationship between a given reference point in the real space and the real position; and the image of the partial region or the image of the part of the object, each of which the display is controlled by the display control section to display, is determined so that the virtual space is displayed on the same scale as the real space.

The above configuration enables a passenger of the moving body to experience a visual effect that makes the passenger feel as if the real space and the virtual space have merged.

In order to attain the objective, an output control system in accordance with an aspect of the present disclosure is an output control device, including: the output control device; a positioning device configured to measure data pertaining to the real position of the moving body; the storage device; the display; and the speaker, the position and orientation identifying section of the output control device identifying the real position of the moving body and the orientation of the moving body in the real space on the basis of the data pertaining to the real position and obtained from the positioning device. With the above configuration, it is possible to bring about an effect similar to that of the output control device.

Advantageous Effects of Invention

An aspect of the present disclosure makes it possible to provide a realistic video and audio to a passenger of a moving body.

DESCRIPTION OF EMBODIMENTS

Embodiment 1

An output control system in accordance with Embodiment 1 is a system for controlling an output of an image and audio in an inner space of a moving body. The output control system provides a passenger of the moving body with an image and audio of a virtual space that is linked with a real world. That is, an output control system 100 provides mixed reality (MR) in an inner space of a moving body.

The following description will discuss in detail, with reference to FIGS. 1 through 6, configurations and operations of various devices included in the output control system in accordance with Embodiment 1. As used herein, the term "image" encompasses both a still image and a moving image. As used herein, the term "audio" refers to all kinds of sound including not only a human voice but also a sound effect, ambient sound, back ground music, and the like.

<<Example of Operation of System>>

Figure 1:
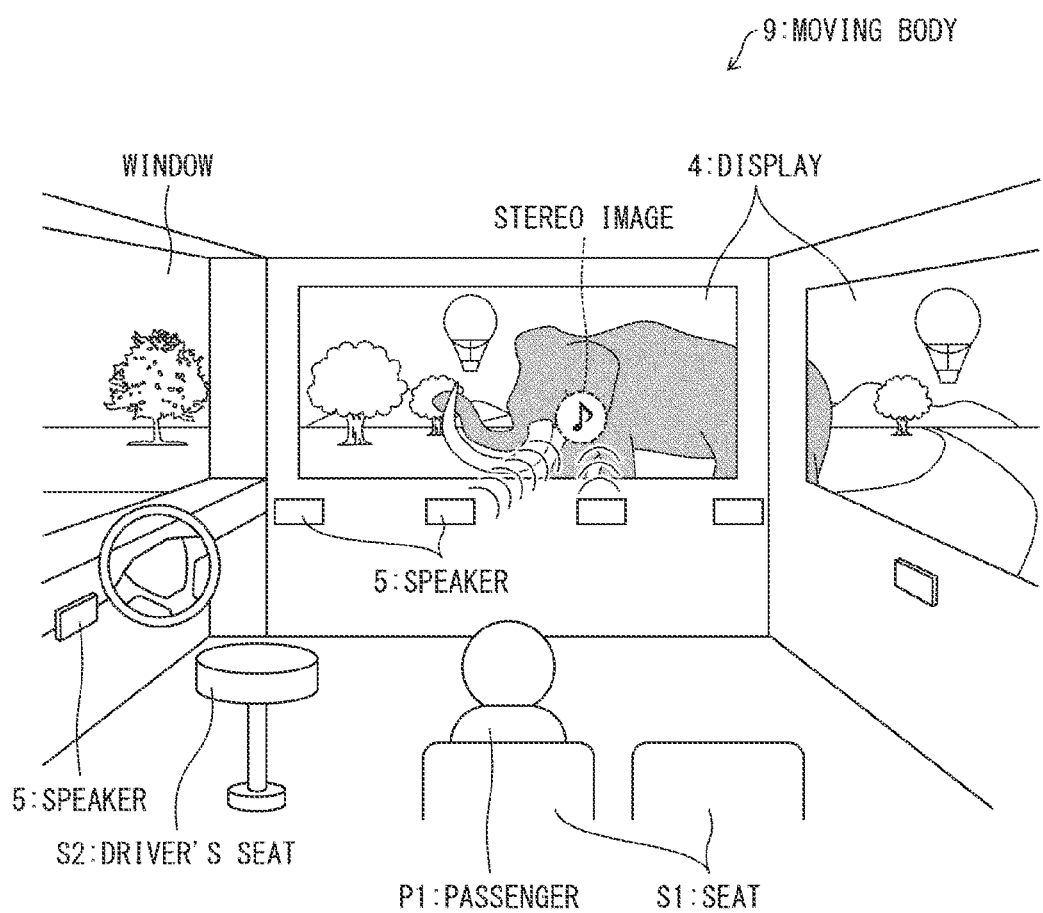
FIG. 1 is a view illustrating an example of an operation of an output control system in accordance with Embodiment 1 of the present disclosure.

First, the following description will provide an overview of an operation of the output control system 100. FIG. 1 is a view illustrating an example of an operation of the output control system 100 in accordance with Embodiment 1. FIG. 1 is a view of an inner space of a moving body 9, which includes the output control system 100, as viewed from behind a passenger P1 staying in the inner space. As illustrated in FIG. 1, seats S1, a driver's seat S2, displays 4, and speakers 5 are provided in the inner space of the moving body 9. Note that the seats S1 and the driver's seat S2 are not an essential part of the output control system 100. The number of display(s) 4 and the number of speaker(s) 5 are not limited to those shown in FIG. 1.

(Inner Space of Moving Body 9)

In the case of the inner space of the moving body 9 illustrated in FIG. 1, the displays 4 are provided on at least two wall surfaces that are neither in front of the driver's seat nor behind the seats S1. In the case illustrated in FIG. 1, a window, not a display 4, is provided in front of the driver's seat. In the case illustrated in FIG. 1, there is no limitation on a structure of a wall behind the seats S1. On one of the seats S1, the passenger P1 who stays in the inner space of the moving body 9 is seated. Hereinafter, a "passenger P1 who stays in the inner space of the moving body 9" will be referred to simply as a "passenger". The output control system 100 controls each of the displays 4 to display an image in which scenery of a virtual space is drawn. The output control system 100 controls each of the speakers 5 to output audio for representing the virtual space.

(Virtual Space)

As used herein, the term "virtual space" refers to a three-dimensional space model which includes (i) a three-dimensional map of a predetermined range and a three-dimensional object(s) of various kinds provided in the three-dimensional map. The output control system 100 determines a position and an orientation of the moving body 9 in the virtual space in accordance with a position and an orientation of the moving body 9 in a real space (this will be described later in detail). Hereinafter, for convenience, a position in the real space will be referred to as a "real position". A position in the virtual space will be referred to as a "virtual position". An orientation in the real space will be referred to as a "real orientation", and an orientation in the virtual space will be referred to as a "virtual orientation". The output control system 100 controls, in accordance with the virtual position and the virtual orientation of the moving body 9 which have been determined, image display carried out by the displays 4 and audio output carried out by the speakers 5.

In the present specification, the real space and the virtual space may be different from each other, or may be the same. For example, the virtual space can be a space model that is an accurate copy of the real space in which the moving body 9 actually travels, or can be a space model that represents a space in which the moving body 9 cannot possibly travel in reality, such as at the bottom of the sea or in the sky. In the virtual space, a map and an object each representing an item or an event that exists in the real space can coexist with a map and an object each representing an item or an event that does not exist in the real space.

(Display Control and Audio Output Control)

The output control system 100 generates the image in which the scenery of the virtual space is drawn, which scenery would be seen from the moving body 9 in the virtual position and the virtual orientation. The output control system 100 controls each of the displays 4 to display the image thus generated. For example, a region of the virtual space drawn by the output control system 100 is determined in accordance with (i) the virtual position and the virtual orientation of the moving body 9, (ii) a position and an orientation of each of the displays 4 in the real space, and (iii) a size and a shape of each of the displays 4.

In Embodiment 1, unless otherwise indicated, a three-dimensional map in the virtual space and a three-dimensional object(s) in the virtual space are a map and an object(s) that can be drawn as scenery (i.e., that are not transparent). Note, however, that at least a part of the three-dimensional map in the virtual space can be a transparent map not displayed on the displays 4. Further, at least a part of the three-dimensional object(s) in the virtual space can be a transparent object not displayed on the displays 4.

The output control system 100 controls the speakers 5 to output audio for representing the virtual space. The output control system 100 (i) identifies audio that would be heard by the passenger if the passenger was present in the virtual position and the virtual orientation of the moving body 9 and (ii) controls the speakers 5 to output the audio so as to recreate a way in which the audio would be heard in the virtual position and the virtual orientation.

More specifically, the output control system 100 controls the speakers 5 to control a position of a stereo image formed by the outputted audio. For example, the output control system 100 controls the speakers 5 so that a direction of a position at which the stereo image is formed in the inner space of the moving body 9 is the same as a direction from the virtual position and the virtual orientation of the moving body 9 to an audio source object. In the example illustrated in FIG. 1, in order to represent utterance of audio from a mammoth (i.e., an object in the virtual space) displayed on the displays 4, the output control system 100 controls the speakers 5 so as to form a stereo image near a position at which the mammoth is displayed.

(Movement of Moving Body 9 and Changes in Image and Audio)

The output control system 100 regularly identifies the real position and the real orientation of the moving body 9 and regularly updates the virtual position and the virtual orientation of the moving body 9 in accordance with the real position and the real orientation. Further, in accordance with the virtual position and the virtual orientation thus updated, the output control system 100 regularly updates also an image to be displayed on the displays 4, audio to be outputted by the speakers 5, and a position of a stereo image of the audio. Thus, the output control system 100 can change, in real time in accordance with an operation of the moving body 9, display of each of the displays 4 and output of audio from each of the speakers 5.

For example, when the moving body 9 is traveling, the output control system 100 can display scenery of the virtual space which changes in accordance with the traveling of the moving body 9. Further, for example, the output control system 100 can represent, by a change in position at which the stereo image is formed, (i) a change in relative positions of the moving body 9 and an object from which audio would be uttered and (ii) a change in relative directions of the moving body 9 and the object. The output control system 100 can thus cause the passenger P1 to experience an image and immersive audio which make the passenger P1 feel as if the moving body 9 is traveling in the virtual space.

<<Configuration of Main Parts>>

Figure 2:
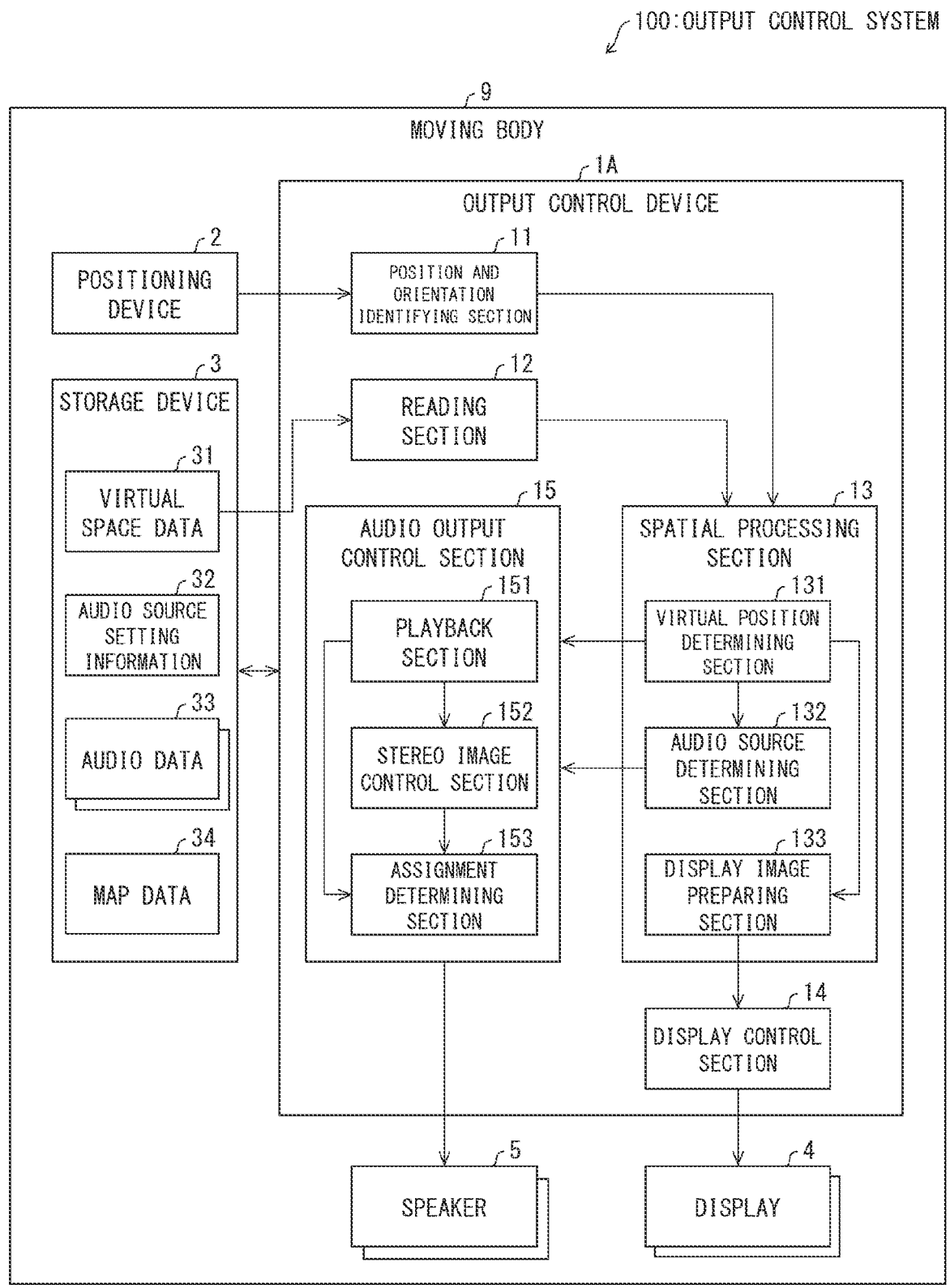
FIG. 2 is a block diagram illustrating configurations of main parts of various devices included in the output control system.

The following description will discuss configurations of various devices included in the output control system 100. FIG. 2 is a block diagram illustrating configurations of main parts of the various devices included in the output control system 100 in accordance with Embodiment 1. The output control system 100 includes an output control device 1A, a positioning device 2, a storage device 3, the displays 4, and the speakers 5. At least the output control device 1A, the displays 4, and the speakers 5 are provided in the inner space of the moving body 9. In the example of Embodiment 1, the positioning device 2 and the storage device 3 are also provided in the inner space of the moving body 9. Note that the storage device 3 can be included in the output control device 1A.

(Positioning Device 2)

The positioning device 2 collects information pertaining to the real position of the moving body 9. The positioning device 2 supplies, to the output control device 1A, the information (which will also be referred to as positioning data) obtained by measurement. A specific structure of the positioning device 2 is not particularly limited. For example, the positioning device 2 can be a light detection and ranging (DAR) which detects a structure in the vicinity of the moving body 9. In this case, the positioning data is information indicative of a size and a shape of the structure in the vicinity of the moving body 9. Further, the positioning device 2 can be a GPS receiver. In this case, the positioning data is information indicative of a latitude and a longitude received from a GPS satellite.

(Storage Device 3)

The storage device 3 is a device in which various pieces of information necessary for an operation of the output control device 1A are stored. The storage device 3 contains at least virtual space data 31, audio source setting information 32, and audio data 33. The storage device 3 can contain map data 34.

The virtual space data 31 is a set of various data pertaining to construction of the virtual space. The virtual space data 31 contains, for example, map data of the virtual space and data of the object provided in the virtual space. The virtual space data 31 is prepared and stored in the storage device 3 in advance. In Embodiment 1, one type of virtual space data 31 is stored in the storage device 3. Note, however, that a plurality of types of virtual space data 31 may be stored in the storage device 3.

(Specific Example of Virtual Space)

Figure 3:
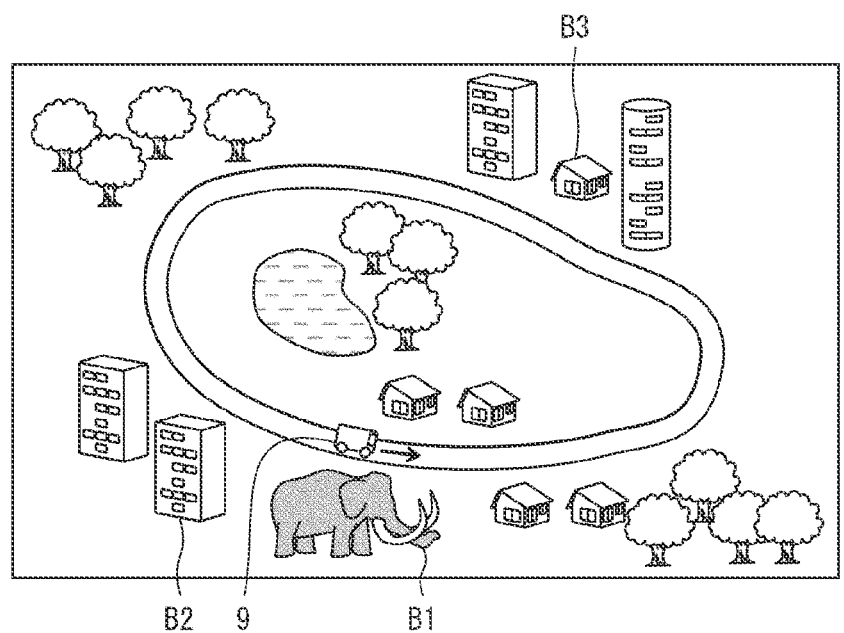
FIG. 3 is a view illustrating a specific example of a virtual space in accordance with Embodiment 1 of the present disclosure.

FIG. 3 is a view illustrating a specific example of the virtual space. FIG. 3 is a two-dimensional picture schematically illustrating the virtual space, but the actual virtual space is a three-dimensional model. In FIG. 3, the position and the orientation of the moving body 9 in the virtual space are also illustrated.

In the virtual space, at least one audio source object, which is set as a virtual audio source, is provided. The term "virtual audio source" refers to a source of a sound in the virtual space. Note that the term "source of a sound" herein does not mean that the sound is actually generated, but means a setting where the sound is generated.

In the example illustrated in FIG. 3, an object B1 of a mammoth, an object B2 of a building, and an object B3 of a house are each an audio source object. Thus, an audio source object can be an immobile object, or can be an object that regularly or irregularly moves. In cases other than the example illustrated in FIG. 3, for example, in a case where the virtual space is a space representing a road and a town, an audio source space can be an object in a fixed position, such as a railroad crossing, or can be an object whose position changes, such as a train, an automobile, or a person.

Note that an audio source object can be an object that can be drawn, i.e., displayed on the displays 4, or can be a transparent object that cannot be drawn. For example, the object B1 of the mammoth illustrated in FIG. 3 can be an object that can be displayed on the displays 4 and that is an audio source object. Alternatively, for example, the object B1 of the mammoth illustrated in FIG. 3 can be an object that can be displayed on the displays 4 and that is not an audio source object. Then, an audio source object of audio related to the object B1, such as audio uttered by the mammoth or the sound of footsteps of the mammoth, can be provided as a transparent object which is different from the object B1.

Which one(s) of the objects included in the virtual space data 31 is/are an audio source object(s) is defined by the audio source setting information 32. The audio source setting information 32 is information indicative of assignment of audio data 33 to an audio source object. More specifically, the audio source setting information 32 is information in which identification information of an object that is an audio source object and identification information of audio data 33 are stored in association with each other. Examples of identification information of an object include an ID assigned to each object in the virtual space data 31. Examples of identification information of audio data 33 include a file name of the audio data 33.

The audio source setting information 32 can include information indicative of an audio volume of audio data 33. For example, the audio source setting information 32 can be information in which identification information of audio data 33 and information indicative of a set audio volume of the audio data 33 are stored in association with identification information of an audio source object. The set audio volume indicates a playback volume in which the audio data 33 is played back in a case where a distance from the virtual position of the moving body 9 to the audio source object is zero. The set audio volume can be set, for example, to a numerical value of 1 to 100. In this case, the set audio volume can be such that 1 is the smallest audio volume, and 100 is the largest audio volume.

The audio data 33 is data of audio outputted from the speakers 5. The audio data 33 is read out by the output control device 1A to be played back or processed (e.g. addition of an effect) at an audio output control section 15 (described later), and then is outputted from the speaker 5. In a case where the audio source setting information 32 includes a set audio volume of the audio data 33, the audio output control section 15 can attenuate the audio volume of the audio data 33 in accordance with the distance from the virtual position of the moving body 9 to the audio source object in the virtual space.

The map data 34 is data including information such as a geography of an area in which the moving body 9 can travel, a shape of a road, and a structure that serves as a landmark. In the output control system 100, a method for obtaining the map data 34 is not particularly limited. For example, in a case where a car navigation system is included in the moving body 9, the storage device 3 can be connected to the car navigation system and download the map data 34 in advance.

The map data 34 is used in identifying the real position of the moving body 9 on the basis of positioning data. As such, in a case where the real position of the moving body 9 is directly known from the positioning data, the storage device 3 need not store the map data 34. For example, in a case where the positioning device 2 is a GPS receiver, the positioning data indicates a latitude and a longitude, and the map data 34 is thus not essential information.

(Output Control Device 1A)

The output control device 1A is a device which centrally controls the displays 4 and the speakers 5. The output control device 1A generates an image in accordance with the real position and the real orientation of the moving body 9, and supplies the image to the displays 4. The output control device 1A determines, in accordance with the real position and the real orientation of the moving body 9, audio to be outputted from the speakers 5, and determines a mode of output of the audio from the speakers 5. Examples of the "mode of output of the audio" herein include a position of a stereo image formed by the audio. The output control device 1A supplies the speakers 5 with audio to be outputted and controls output of the audio from the speakers 5 so that a stereo image is formed in a position determined by the output control device 1A.

(Details of Configuration of Output Control Device 1A)

More specifically, the output control device 1A includes a position and orientation identifying section 11, a reading section 12, a spatial processing section 13, a display control section 14, and the audio output control section 15.

The position and orientation identifying section 11 identifies the real position and the real orientation on the basis of the positioning data obtained from the positioning device 2. The position and orientation identifying section 11 supplies the spatial processing section 13 with information indicative of the real position thus identified and information indicative of the real orientation thus identified.

The position and orientation identifying section 11 identifies the real position, for example, in the following manner. In a case where the positioning device 2 is a LiDAR, the position and orientation identifying section 11 identifies the real position of the moving body 9 by comparing positioning data of the LiDAR with the map data 34 stored in the storage device 3. In a case where the positioning device 2 is a GPS receiver and positioning data is information already indicative of the real position (e.g. a latitude and a longitude) of the moving body 9, the position and orientation identifying section 11 uses the obtained positioning data as it is as information indicative of the real position.

The position and orientation identifying section 11 identifies the real orientation, for example, in the following manner. In a case where the positioning device 2 is a LiDAR, comparison of the positioning data and the map data 34 in identifying the real position enables identifying the real orientation at the same time. In a case where the positioning device 2 is another device which is not a LiDAR, the position and orientation identifying section 11 first carries out identification of the real position on the basis of the positioning data a plurality of times, and compares the thus obtained real positions to identify a direction in which the real position moves. The position and orientation identifying section 11 identifies the direction in which the real position of the moving body 9 moves to be a traveling direction of the moving body 9, i.e., the real orientation of the moving body 9. In a case where the real position has not changed over a plurality of times of identification, that is, in a case where the moving body 9 has not moved, the real orientation last identified can be used as it is by the position and orientation identifying section 11.

The reading section 12 reads the virtual space data 31 from the storage device 3 and supplies the virtual space data 31 to the spatial processing section 13. A timing at which the reading section 12 reads the virtual space data 31 and a timing at which the reading section 12 supplies the virtual space data 31 to the spatial processing section 13 are not particularly limited. For example, the reading of the virtual space data 31 and the supply of the virtual space data 31 to the spatial processing section 13 by the reading section 12 can be carried out in response to a request from the spatial processing section 13, or can be carried out every time the virtual space data 31 is updated. In a case where a plurality of types of virtual space data 31 are stored in the storage device 3, the reading section 12 can determine which type of virtual space data 31 is to be read.

The spatial processing section 13 carries out various processes using the virtual space data 31. More specifically, the spatial processing section 13 includes a virtual position determining section 131, an audio source determining section 132, and a display image preparing section 133.

The virtual position determining section 131 determines a virtual position and a virtual orientation of the moving body 9 in accordance with the real position and the real orientation of the moving body 9 supplied from the position and orientation identifying section 11. The virtual position determining section 131 supplies information indicative of the virtual position and information indicative of the virtual orientation to the audio output control section 15, the audio source determining section 132, and the display image preparing section 133.

A specific method by which the virtual position determining section 131 determines the virtual position and the virtual orientation can be determined as appropriate in accordance with a type and a characteristic of the virtual space data 31. For example, it is preferable that the virtual position determining section 131 define in advance that a given point in the real space and a given point in the virtual space are each a reference point, and determine the virtual position so that a positional relationship between the reference point in the virtual space and the virtual position is similar to a positional relationship between the reference point in the real space and the real position. A method for prescribing the above reference points is not particularly limited. For example, a point of a certain latitude and a certain longitude on a map can be prescribed to be a reference point, or a real position and a virtual position that are initially determined by the position and orientation identifying section 11 and the virtual position determining section 131 can thereafter be used as reference points.

In a case where the display image preparing section 133 (described later) draws the virtual space on the same scale as the real space, the virtual position determining section 131 can determine the virtual position of the moving body 9 so that the virtual position substantially coincides with the real position of the moving body 9, and the virtual position determining section 131 can determine the virtual orientation of the moving body 9 so that the virtual orientation substantially coincides with the real orientation of the moving body 9. This enables the position of the moving body 9 in the real space and the position of the moving body 9 in the virtual space to be linked to each other.

The audio source determining section 132 selects an audio source object from which audio would be heard by the passenger if the passenger was in the virtual position (and the virtual orientation) of the moving body 9. In other words, the audio source determining section 132 determines an audio source object corresponding to the audio data 33 to be outputted as audio. The audio source determining section 132 selects, for example, an audio source object that is present within a predetermined range from the virtual position of the moving body 9 in the virtual space. The audio source determining section 132 identifies, on the basis of the virtual space data 31, identification information of the audio source object thus selected. The audio source determining section 132 supplies the audio output control section 15 with the thus identified identification information of the audio source object.

The audio source determining section 132 can select an audio source object on the basis of (i) a set audio volume of audio data 33 assigned to the audio source object and (ii) a distance from the virtual position of the moving body 9 to the audio source object. For example, the audio source determining section 132 can select an audio source object by carrying out processes of the following steps 1 through 4.

Step 1: Calculate distances from a virtual position of the moving body 9 to respective audio source objects.

Step 2: On the basis of the audio source setting information 32, identify a set audio volume of audio data 33 corresponding to each of the audio source objects.

Step 3: Identify, for each of the audio source objects, a playback volume on the basis of the distance calculated in Step 1 and the set audio volume. For example, the greater the distance calculated in Step 1 is, the more the audio source determining section 132 can attenuate the set audio volume identified in Step 2. In a case where the distance is zero, the set audio volume itself is used as a playback volume.

Step 4: an audio source object whose playback volume is not lower than a threshold is selected as the "audio source object corresponding to the audio data 33 to be outputted as audio."

The "distances from a virtual position of the moving body 9 to respective audio source objects" can each be an absolute distance, or can be a relative distance. Step 1 and Step 2 can be carried out in any order. The threshold in Step 4 can be set as appropriate. The audio source determining section 132 can supply the audio output control section 15 with the playback volume identified in Step 3.

According to the above steps, even with respect to, for example, an audio source object that is very distant from the moving body 9 in the virtual space, audio data 33 assigned to the audio source object can be outputted in a case where a playback volume of the audio data 33 is not less than the threshold. As such, audio heard in the distance, such as the sound of fireworks or a siren, can be more accurately reproduced.

The display image preparing section 133 prepares, in accordance with the virtual position and the virtual orientation of the moving body 9, an image to be displayed by a display 4. The display image preparing section 133 supplies the image thus prepared to the display control section 14. Note that the display image preparing section 133 can instruct the display control section 14 as to a timing for displaying the image thus supplied. In a case where a plurality of displays 4 are provided, the display image preparing section 133, when supplying an image, can instruct the display control section 14 as to which of the plurality of displays 4 the image is to be displayed on.

For example, the display image preparing section 133 provides, in the virtual space, virtual cameras whose fields of view correspond to the respective displays 4, and draws an area captured by each of the virtual cameras as a display image to be displayed on a display 4 corresponding to the each of the virtual cameras. A position and orientation of each of the virtual cameras, and a shape and width of the field of view of each of the virtual cameras are determined on the basis of the following (1) to (3).

(1) The virtual position and the virtual orientation of the moving body 9

(2) A position and an orientation of each display 4 in the real space (3) A size and a shape of each display 4

Note that the output control system 100 can include a vehicle interior camera and/or a vehicle interior sensor capable of detecting a position of the head of a passenger by image capturing, measurement, or the like. The output control device 1A can be connected to the vehicle interior camera and/or the vehicle interior sensor. The spatial processing section 13 of the output control device 1A can identify a position of the head of a passenger on the basis of an image captured by the vehicle interior camera and/or a result of measurement by the vehicle interior sensor.

In a case where the spatial processing section 13 identifies a position of the head of a passenger, a region to be cut out from the captured image can be determined by the display image preparing section 133 on the basis of the position of the head of the passenger in addition to the above (1) to (3). This enables each of the displays 4 to display an image in accordance with a height of the passenger.

Specifically, the following description will discuss the displayed image on the basis of the example illustrated in FIG. 1. When a traveling direction of the moving body 9 is defined as "front" and a direction opposite to the traveling direction is defined as "back", the direction of the driver's seat S2 in the moving body 9 is front in the real space illustrated in FIG. 1. The displays 4 are provided substantially vertically on a right wall surface and a back wall surface, respectively, in the inner space of the moving body 9. In this case, the display image preparing section 133 prepares, for the display 4 provided on the right wall surface in the inner space, an image in which scenery on the right of the moving body 9 in the virtual space is drawn. Further, the display image preparing section 133 prepares, for the display 4 provided on the back wall surface in the inner space, an image in which scenery behind the moving body 9 in the virtual space is drawn.

Thus, as illustrated in FIG. 1, scenery on the right to behind the moving body 9 in the virtual space is displayed by the two displays 4. That is, from the viewpoint of the passenger P1, the passenger P1 can see scenery of the virtual space through the displays 4 together with real scenery seen through the window at the driver's seat. Note that the term "scenery of the virtual space" herein of course contains an object(s) as well as a map. For example, in a case where all or part of the three-dimensional map is a transparent map which is not drawn, the display image preparing section 133 can prepare an image in which a part of the object(s) in the virtual space is drawn, and supply the image to the display control section 14.

Note that the display image preparing section 133 can determine a magnification of each of the virtual cameras so that the virtual space is displayed on the same scale as the real space. In other words, when drawing the scenery of the virtual space, the display image preparing section 133 can enlarge or reduce the scenery so that the virtual space is displayed on the same scale as the real space on the displays 4. This enables a passenger of the moving body to experience a visual effect that makes the passenger feel as if the real space and the virtual space have merged. Further, in a case where the moving body 9 is traveling, it is possible to prevent a passenger from suffering from what is known as "3D sickness", since the scenery of the real space and the scenery of the virtual space move at the same speed.

The display control section 14 controls each of the displays 4 to display an image supplied from the display image preparing section 133 of the spatial processing section 13. In a case where the display image preparing section 133 has provided an instruction as to a timing for displaying an image on each of the displays 4, the display control section 14 follows the instruction and controls each of the displays 4 to display the image at the specified timing. In a case where a plurality of displays 4 are provided, the display control section 14 carries out control in accordance with an instruction from the spatial processing section 13 as to which image is to be displayed on which of the plurality of displays 4.

The audio output control section 15 carries out various processes related to audio output and formation of a stereo image. More specifically, the audio output control section 15 includes a playback section 151, a stereo image control section 152, and an assignment determining section 153.

The playback section 151 plays back audio data 33 assigned to the audio source object determined by the audio source determining section 132. More specifically, the playback section 151 first identifies audio data 33 assigned to the audio source object determined by the audio source determining section 132, by searching the audio source setting information 32 in the storage device 3 with use of the identification information of the audio source object as a key. Subsequently, the playback section 151 reads out the thus identified audio data 33 from the storage device 3 and plays back the audio data 33. The playback section 151 sequentially supplies audio to the stereo image control section 152 while playing back the audio. The playback section 151 can sequentially supply the audio played back also to the assignment determining section 153.

In a case where there are a plurality of audio source objects determined by the audio source determining section 132, that is, in case where there are a plurality of audio data 33 to be played back, the playback section 151 supplies the plurality of audio data 33 individually to the stereo image control section 152 (and the assignment determining section 153) while playing back the plurality of audio data 33 individually. In a case where the audio output control section 15 has received, from the audio source determining section 132, information indicative of playback volumes of audio data 33, the playback section 151 can play back each audio data 33 at a playback volume determined for the each audio data 33.

The stereo image control section 152 determines a position at which a stereo image of outputted audio is formed. In a case where a plurality of audio have been simultaneously supplied from the playback section 151, the stereo image control section 152 can determine, individually for each audio, a position at which a stereo image is formed. The position of a stereo image can be determined by the stereo image control section 152 in real time. That is, the stereo image control section 152 can control, in real time, a position at which a stereo image of the audio data 33 outputted is formed.

Specifically, the stereo image control section 152 determines, on the basis of at least the following (1) and (2), a position at which a stereo image is formed.

(1) The virtual orientation of the moving body 9 determined by the virtual position determining section 131

(2) A relative positional relationship between the virtual position of the moving body 9 and the audio source object Further, the stereo image control section 152 can correct the position of the stereo image on the basis of assignment to the speakers 5 determined by the assignment determining section 153 (described later).

The assignment determining section 153 determines, in real time, a speaker 5 from which the audio sequentially supplied from the playback section 151 is to be outputted (that is, a speaker 5 to which the audio to be played back is to be assigned). In a case where there is only one speaker 5 provided in the moving body 9, the audio output control section 15 need not include the assignment determining section 153. In a case where a plurality of audio have been simultaneously supplied from the playback section 151, the assignment determining section 153 can determine assignment to a speaker 5 individually for each audio. The assignment determining section 153 can feedback, to the stereo image control section 152, determined assignment to the speakers 5.

When the playback of the audio data 33 to be outputted, the position at which the stereo image is to be formed, and the assignment to the speakers 5 are thus determined by the audio output control section 15, the audio output control section 15 instructs the speakers 5 to carry out audio output in accordance with the above assignment. In so doing, the audio output control section 15 also provides an instruction on an actual volume of audio outputted from each of the speakers 5 and a mode of output from each of the speakers 5. In this manner, the audio output control section 15 can create, with use of the speakers 5, a stereo image in a position determined by the stereo image control section 152.

(Displays 4 and Speakers 5)

The displays 4 are each a display device which displays an image under the control of the output control device 1A. A type of each of the displays 4 is not particularly limited. For example, the displays 4 can each be a transparent display. The speakers 5 are each an audio output device which outputs audio under the control of the output control device 1A. A type of each of the speakers 5 is not particularly limited, but the speakers 5 are audio output devices which are capable of localizing a sound, i.e., forming a stereo image, by themselves or in cooperation between the audio output devices. The speakers 5 are each an audio output device capable of adjusting a direction in which audio is outputted, a volume of audio output, and the like to change a position where a stereo image is formed.

Figure 4:
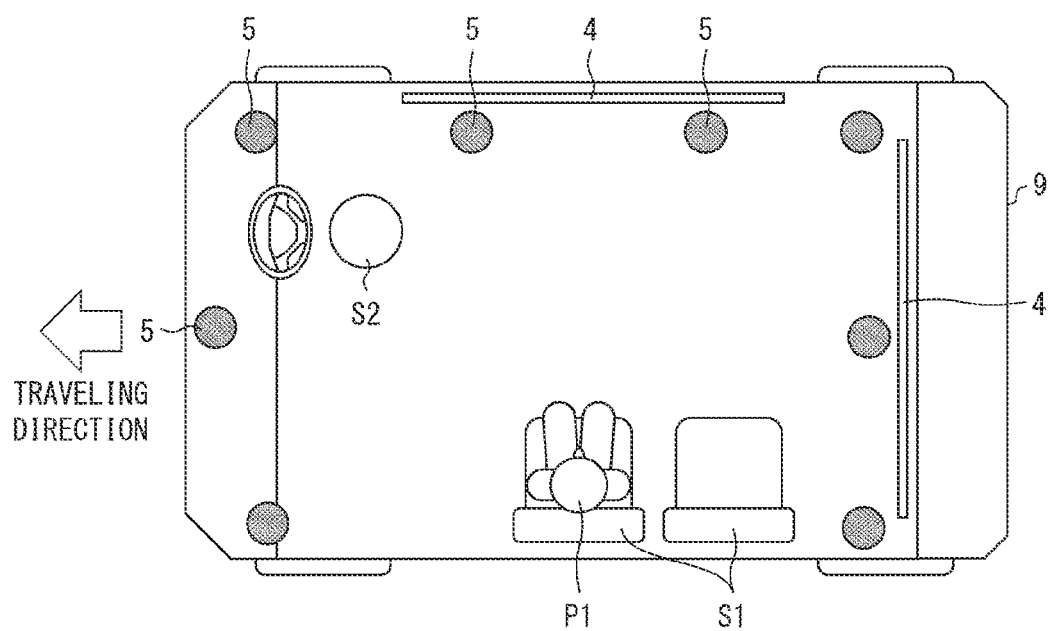
FIG. 4 is a view illustrating an example of how displays and speakers are provided in a moving body in accordance with Embodiment 1 of the present disclosure.

FIG. 4 is a view illustrating an example of how the displays 4 and the speakers 5 are provided in the moving body 9. FIG. 4 is a view of the moving body 9 as viewed from a ceiling surface of the moving body 9. The displays 4 and the speakers 5 are provided, for example as illustrated in FIG. 4, on wall surfaces of the moving body 9 so as to surround the seats S1 on which the passenger P1 sits.

In a more specific example, in the inner space of the moving body 9, for example, at least one of three wall surfaces that are not the wall surface in the traveling direction is provided with a display 4 which is substantially parallel to the at least one of the three wall surfaces. A speaker 5 is provided, for example, on at least one of the wall surfaces and/or on the ceiling surface in the inner space of the moving body 9. The position(s) of the display(s) 4 and the position(s) of the speaker(s) 5 are not limited to these examples. For example, some of the displays 4 and/or the speakers 5 can be provided on a floor surface of the moving body 9.

The position, size, and shape of a display 4 can be freely determined, provided that the operation of the moving body 9 is not negatively affected. For example, in a case where the moving body 9 is manually driven, a window can be provided in front of the driver's seat S2, and displays 4 can be provided on other wall surfaces in the inner space, as illustrated in FIGS. 1 and 4. Alternatively, for example, in a case where the moving body 9 is completely automatically driven, the driver's seat S2 is not present. In this case, all of the wall surfaces in the inner space of the moving body 9 can be provided with displays 4. However, to provide the foregoing MR, it is preferable that the displays 4 be provided so that scenery of the real world is seen through at least a part of the windows of the moving body 9.

A height at which a display 4 is provided and an orientation of the display 4 are not particularly limited. It is preferable, however, that a display 4 be provided at such a height and in such an orientation that the passenger P1 can easily enjoy an image on the display 4. Further, a height at which each of the speakers 5 is provided and an orientation of each of the speakers 5 are not particularly limited, provided that the speakers 5 can cooperate with each other to form a stereo image in an appropriate position. In the examples illustrated in FIGS. 1 and 4, each of the displays 4 and each of the speakers 5 are devices independent of each other. However, each of the displays 4 and each of the speakers 5 can be integrally formed.

<<Flow of Process>>

Figure 5:
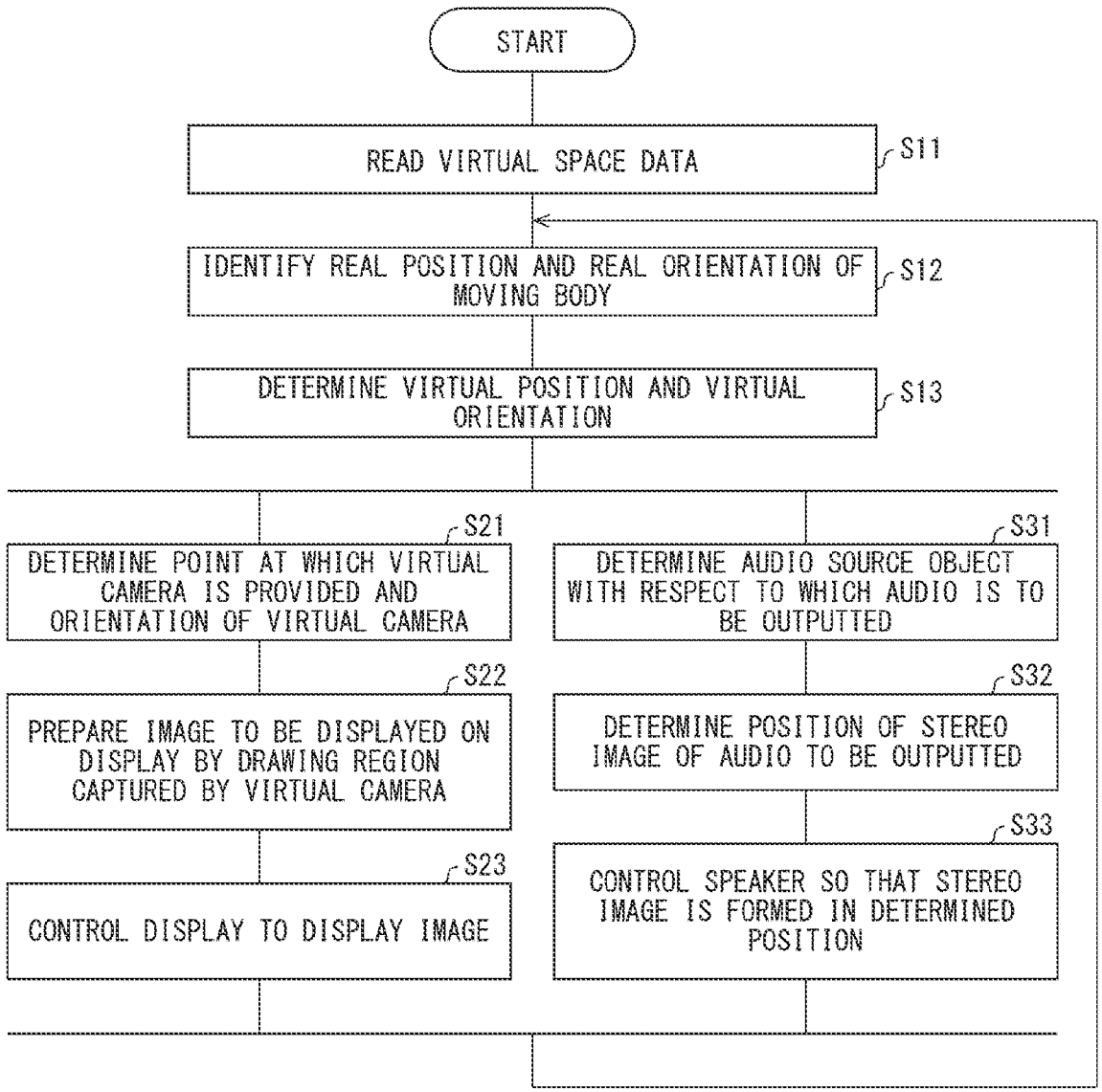
FIG. 5 is a flowchart illustrating a flow of a process carried out by an output control device in accordance with Embodiment 1 of the present disclosure.

FIG. 5 is a flowchart illustrating a flow of a process carried out by the output control device 1A. The timing of starting the process illustrated in FIG. 5 is not particularly limited. For example, the output control device 1A can start the process illustrated in FIG. 5 when an engine of the moving body 9 is driven. Further, the output control device 1A can start the process illustrated in FIG. 5 by being triggered by a predetermined input operation of a passenger, a driver of the moving body 9, or the like via an input device (not illustrated) included in the moving body 9.

First, the reading section 12 reads virtual space data 31 from the storage device 3 (S11). The reading section 12 supplies the virtual space data 31 thus read to the spatial processing section 13.

Subsequently, the position and orientation identifying section 11 identifies a real position and a real orientation of the moving body 9 on the basis of positioning data obtained from the positioning device 2 (S12). The position and orientation identifying section 11 supplies the real position and the real orientation thus identified to the spatial processing section 13.

The virtual position determining section 131 of the spatial processing section 13 determines a virtual position and a virtual orientation in accordance with the real position and the real orientation thus supplied (S13). The virtual position determining section 131 supplies the virtual position and the virtual orientation thus determined to the audio output control section 15, the audio source determining section 132, and the display image preparing section 133.

Then, a set of processes shown in S21 to S23 related to display control and a set of processes shown in S31 to S33 related to audio output control are carried out in any order or carried out in parallel.

The display image preparing section 133 determines a point at which a virtual camera is provided and an orientation of the virtual camera in the virtual space defined by the virtual space data 31 (S21). The number of virtual cameras thus provided corresponds to the number of displays 4, and the orientation of each of the virtual cameras is determined.

Subsequently, the display image preparing section 133 prepares an image to be displayed on each of the displays 4, by drawing a region included in the virtual space and captured by each of the virtual cameras (S22). The display image preparing section 133 supplies the image thus prepared to the display control section 14. The display control section 14 controls the displays 4 to display the images supplied from the display image preparing section 133 (S23).

The audio source determining section 132 determines, in accordance with the virtual position and the virtual orientation supplied from the virtual position determining section 131, an audio source object with respect to which assigned audio is to be outputted (S31). The audio source determining section 132 supplies identification information of the audio source object thus determined to the audio output control section 15.

The playback section 151 of the audio output control section 15 identifies, on the basis of the identification information thus supplied, audio data 33 to be played back, and plays back the audio data. While playing back audio, the playback section 151 sequentially supplies the audio to the stereo image control section 152 (and the assignment determining section 153).

The stereo image control section 152 determines, on the basis of the virtual orientation of the moving body 9 and a relative positional relationship between the virtual position of the moving body 9 and the audio source object, a position of a stereo image of audio to be outputted (S32). The stereo image control section 152 notifies the assignment determining section 153 of the thus determined position at which the stereo image is to be formed. The assignment determining section 153 determines a speaker 5 from which the audio played back by the playback section 151 is to be outputted. That is, the assignment determining section 153 assigns, to at least one speaker 5, the audio which is being played back. The audio output control section 15 controls each of the at least one speaker 5 in accordance with the assignment to the at least one speaker 5 determined by the assignment determining section 153, so that the stereo image is formed in the position determined by the stereo image control section 152 (S33).

The output control device 1A carries out the process of S12 again after the set of processes shown in S21 to S23 related to display control and the set of processes shown in S31 to S33 related to audio output control have ended or while these sets of processes are carried out. That is, the position and orientation identifying section 11 periodically carries out the process of S12. Then, in accordance with the real position and the real orientation updated in S12, the process of S12 and further processes are carried out again. That is, when the real position and the real orientation are updated, the virtual position and the virtual orientation are updated. In response to this, a region included in the virtual space and displayed on each of the displays 4 is updated, and the position of the stereo image formed by the audio outputted from the at least one speaker 5 is updated.

By repeating the process of S12 and subsequent processes in FIG. 5 in this manner, the output control device 1A can control, in real time while the moving body 9 is traveling, display of the displays 4 and output of audio from the speakers 5 in accordance with the real position and the real orientation, each of which regularly changes, of the moving body 9.

<<Position of Virtual Audio Source and Position of Stereo Image>>

Figure 6:
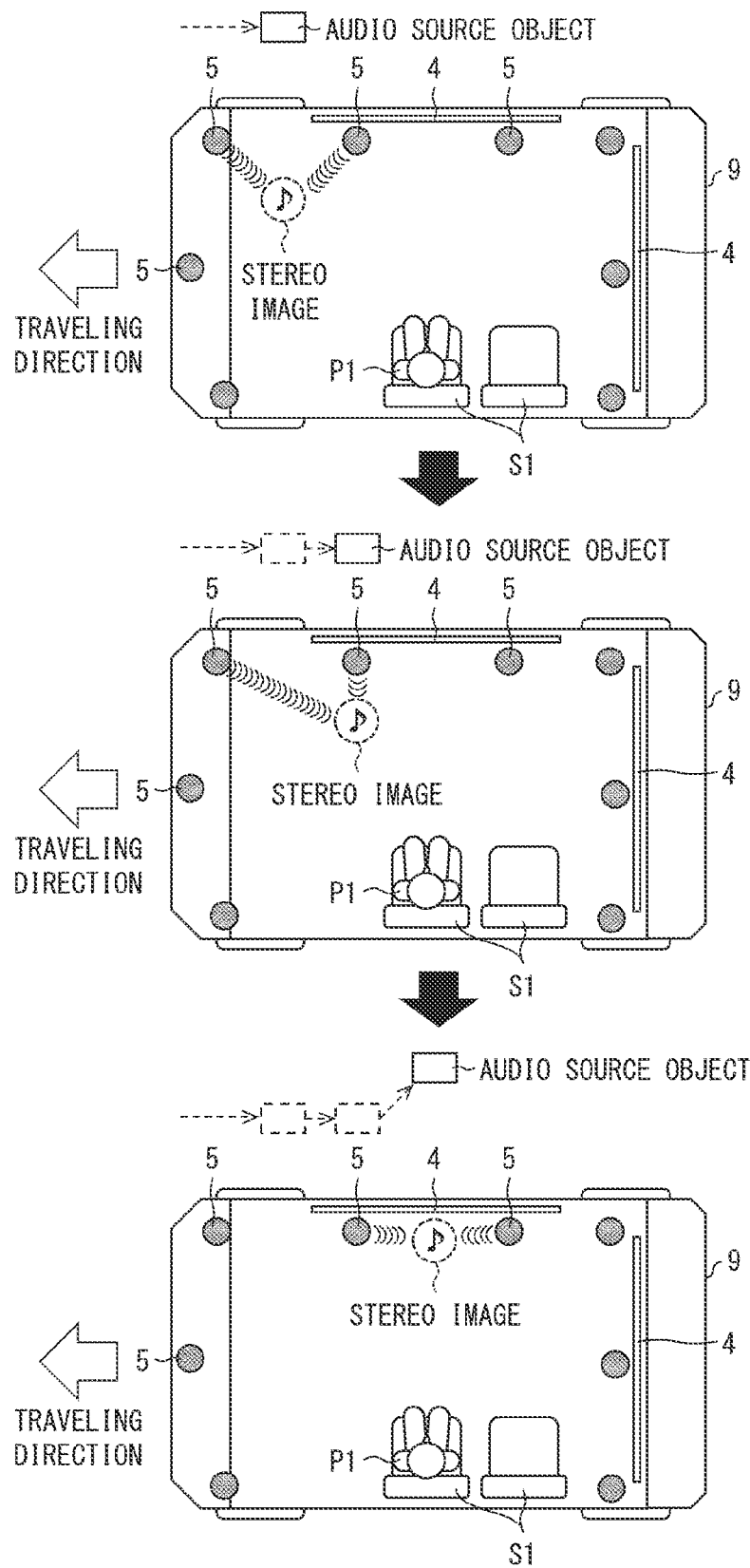
FIG. 6 shows views illustrating a change in relative positional relationship between a moving body and an audio source object in a virtual space and a change in position of a stereo image in a real space.

FIG. 6 shows views illustrating a change in relative positional relationship between the moving body 9 and an audio source object in the virtual space and a change in position of a stereo image in the real space. In FIG. 6, sections of the moving body 9 are identical to those sections illustrated in FIG. 3, and the description thereof will therefore not be repeated. Further, although FIG. 6 illustrates an example in which two speakers 5 are used to form a stereo image, it is possible to form a stereo image of audio by causing the audio to be outputted from one speaker 5 or from three or more speakers 5.

In FIG. 6, for convenience, a positional relationship between the moving body 9 and an audio source object represents a positional relationship in the virtual space, and what is illustrated in the inner space of the moving body 9 represents an event occurring in the real space. Further, it is assumed that time passes in the order of a view at the top, a view in the middle, and a view at the bottom in FIG. 6.

In a case where it is assumed that the audio source object has moved backward as viewed from the moving body 9 in the virtual space as illustrated in the view at the top and the view in the middle in FIG. 6, the stereo image also moves backward similarly. Further, in a case where it is assumed that the audio source object has moved right backward with respect to the moving body 9 as illustrated in the view in the middle and the view at the bottom in FIG. 6, the stereo image also moves right backward similarly.

As described above, an image containing the audio source object is displayed on a display 4. As such, by changing a position of the stereo image as illustrated in FIG. 6, it is possible to change the position of the stereo image so as to link to a position at which the audio source object is displayed. This enables the passenger P1 to experience more realistic audio.

Note that the audio output control section 15 can control output of audio from each of the speakers 5 so that the greater the distance between the moving body 9 and an audio source object in the virtual space, the smaller a volume in which audio corresponding to the audio source object is outputted.

For example, in a case where (i) the audio source setting information 32 is information including a set audio volume of audio data 33 and (ii) the audio source determining section 132 identifies a playback volume of each audio data 33, the greater a distance from the virtual position of the moving body 9 to an audio source object, the smaller a playback volume in which the audio data 33 is played back by the playback section 151. As such, the audio output control section 15 can reduce an actual volume of audio outputted from each of the speakers 5 without changing an amount of amplification of an audio volume of each of the speakers 5.

Further, for example, the audio output control section 15 can obtain, from the audio source determining section 132, information indicative of a distance from the virtual position of the moving body 9 to an audio source object. Then, the audio output control section 15 can control each of the speakers 5 so that the greater the distance, the smaller a volume in which audio corresponding to the audio source object is outputted.

This enables a positional relationship between the moving body 9 in the real space and an audio source object in the virtual space to be represented not only by the position of a stereo image but also by a volume of a sound. This enables a passenger to experience more realistic audio.

Note that the stereo image control section 152 can add an effect to audio outputted from each of the speakers 5 so that the greater a distance between the moving body 9 and an audio source object in the virtual space, the lower a pitch of audio corresponding to the audio source object. This makes it possible to, for example, reproduce an audio effect of a siren of an ambulance or the like. This enables a passenger to experience more realistic audio.

Embodiment 2

An output control device in accordance with an aspect of the present disclosure can control an operation of a vibrating element in accordance with audio output. The following description will discuss Embodiment 2 of the present disclosure with reference to FIGS. 7 and 8. For convenience, members which are identical in function to the members described in Embodiment 1 will be given identical reference signs, and descriptions of those members will not be repeated. The same also applies to the subsequent embodiments.

Figure 7:
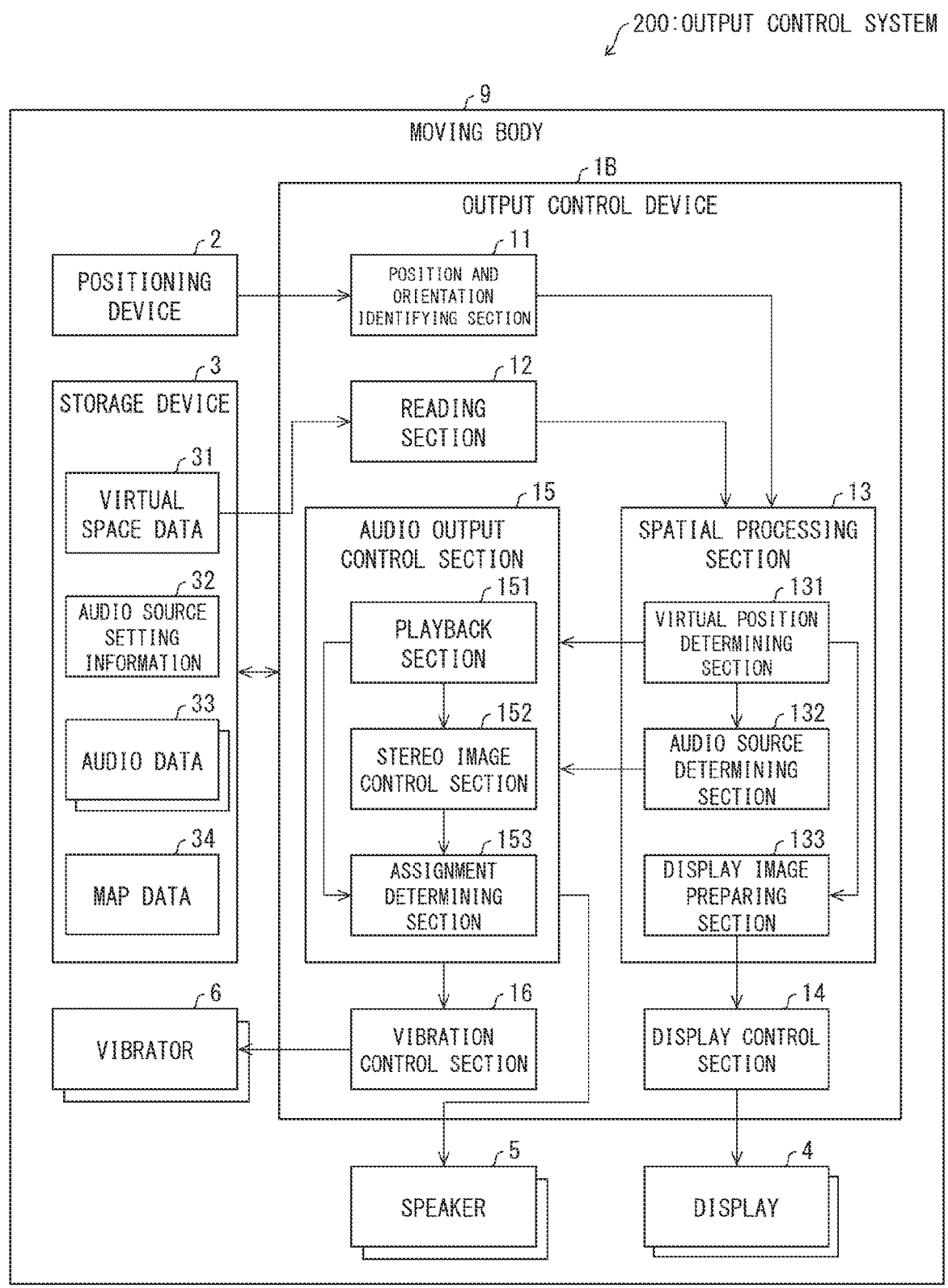
FIG. 7 is a block diagram illustrating configurations of main parts of various devices included in an output control system in accordance with Embodiment 2 of the present disclosure.

FIG. 7 is a block diagram illustrating configurations of main parts of the various devices included in the output control system 200 in accordance with Embodiment 2. The output control system 200 differs from the output control system 100 by including a vibrator 6 and an output control device 1B. Similarly to the output control system 100, the output control system 200 can include a vehicle interior camera and/or a vehicle interior sensor capable of detecting a position of the head of a passenger. The output control device 1B can be connected to the vehicle interior camera and/or the vehicle interior sensor.

Figure 8:
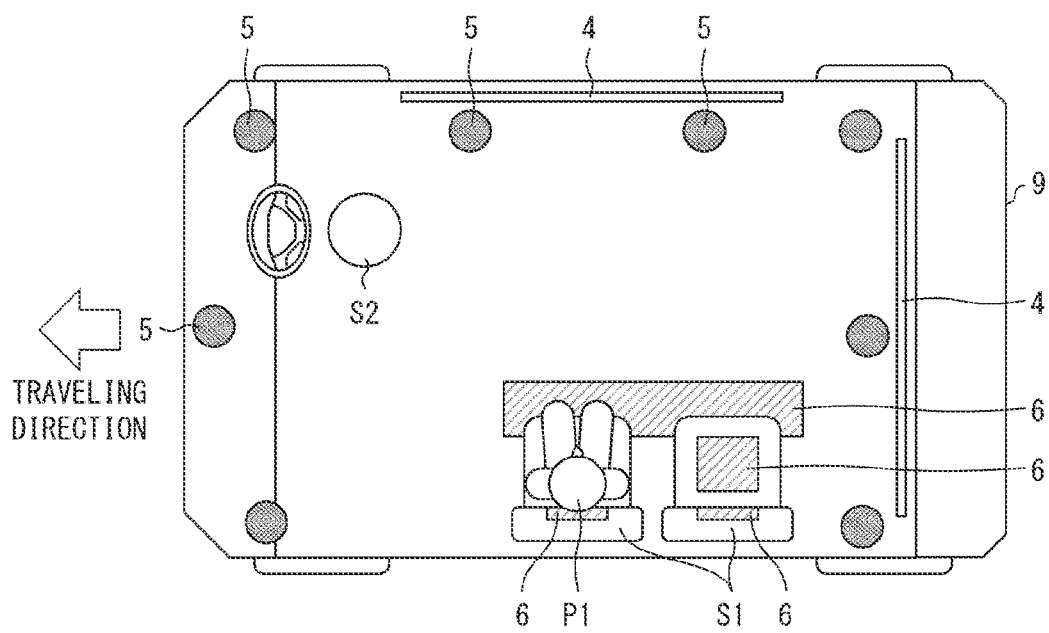
FIG. 8 is a view illustrating an example of how vibrators are provided in the output control system in accordance with Embodiment 2 of the present disclosure.

The vibrator 6 is a set of vibrating elements which applies vibration to a passenger P1. The output control system 200 can include a plurality of vibrators 6. FIG. 8 is a view illustrating an example of how the vibrators 6 are provided in the output control system 200. As illustrated in FIG. 8, the vibrators 6 can be provided, for example, on back surfaces and seating surfaces of seats S1 and on a floor surface which comes in contact with the feet of the passenger P1 when the passenger P1 sits on one of the seats S1.

The output control device 1B differs from the output control device 1A in accordance with Embodiment 1 by including a vibration control section 16. In the output control device 1B, when causing speakers 5 to operate, an audio output control section 15 supplies, to the vibration control section 16, an instruction on operation in accordance with an instruction to the speakers 5.

In accordance with the instruction from the audio output control section 15, the vibration control section 16 controls an operation of each of the vibrators 6. For example, the vibration control section 16 controls (i) in which vibrator a vibrating element is caused to vibrate, (ii) in which part of the vibrator the vibrating element is caused to vibrate, and (iii) in what vibration mode the vibrating element is caused to vibrate. Note here that the "vibration mode" refers to an intensity of vibration, an interval of vibrations, a timing of starting vibration, a timing of stopping the vibration, and the like.

There is no particular limitation to the instruction provided from the audio output control section 15 to the vibration control section 16, a timing for providing the instruction, and the control of the vibrators 6 by the vibration control section 16. For example, the audio output control section 15 can include, in the instruction to the vibration control section 16, information indicative of a volume of audio outputted from each of the speakers 5. Then, the vibration control section 16 can determine, in accordance with the volume of audio outputted from each of the speakers 5, a position at which each of the vibrators 6 vibrates and/or an intensity of vibration of each of the vibrators 6.

For example, in a case where three speakers 5 on the left of the passenger P1 in FIG. 8 each have an audio volume set to be greater than those of two speakers 5 in front of the passenger P1 and three speakers 5 on the right of the passenger P1, the vibration control section 16 can cause the left one of the vibrators 6 on the back surfaces of the seats S1 to vibrate more intensely than the right one of the vibrators 6 on the back surfaces of the seats S1.

With the above process, when audio data 33 is outputted, it is possible to stimulate the passenger P1 by vibration caused in accordance with a mode of output of the audio data 33. For example, in a case where the audio data 33 is a heavy bass sound, an impulsive sound, or the like, applying vibration to the passenger along with output of the audio data 33 makes it possible to more accurately reproduce a phenomenon that would be experienced by a person if such a sound was actually generated. This makes it possible to provide more realistic audio to the passenger P1.

Embodiment 3

In the output control system 100 and the output control system 200, an image in which a virtual space is drawn is displayed on an entire screen of a display 4. However, an output control system in accordance with an aspect of the present disclosure can (i) prepare an image in which a virtual space or an object included in the virtual space is interposed on a part of an image captured of a real world and (ii) cause the image to be displayed on a display 4. That is, an output control system in accordance with an aspect of the present disclosure can be a system which provides a passenger with a virtual experience in an augmented reality (AR) space.

In the output control system 100 and the output control system 200, audio data 33 stored in advance is played back by a speaker 5. However, an output control system in accordance with an aspect of the present disclosure can cause a speaker 5 to output (i) a sound generated in a real world and (ii) audio data 33 whose stereo image is formed in an adjusted position. The following description will discuss Embodiment 3 of the present disclosure with reference to FIG. 9.

<<Configuration of Main Parts>>

Figure 9:
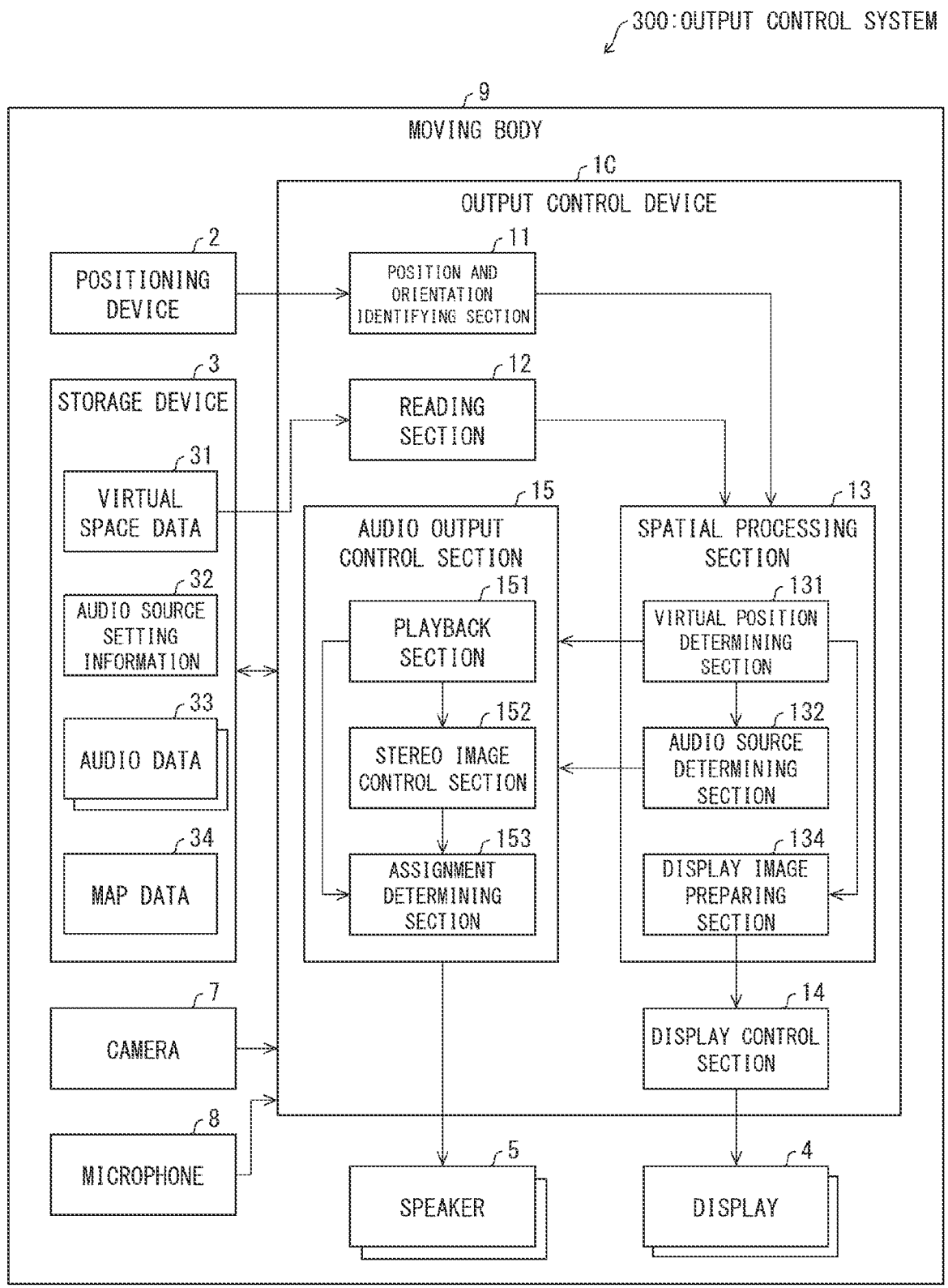
FIG. 9 is a block diagram illustrating configurations of main parts of various devices included in an output control system in accordance with Embodiment 3 of the present disclosure.

FIG. 9 is a block diagram illustrating configurations of main parts of various devices included in an output control system 300 in accordance with Embodiment 3. The output control system 300 differs from the output control system 100 and the output control system 200 by including a camera 7, a microphone 8, and an output control device 1C. Note that the microphone 8 is not an essential part of the output control system 300. In a case where a positioning device 2 is a camera, the positioning device 2 can function also as the camera 7.

Note that the output control system 300 can include a vehicle interior camera and/or a vehicle interior sensor capable of detecting a position of the head of a passenger. The output control device 1C can be connected to the vehicle interior camera and/or the vehicle interior sensor.

The camera 7 captures an image of a real space surrounding a moving body 9. The camera 7 can be a single camera, or a plurality of cameras. It is preferable that the single camera 7 or the plurality of cameras 7 be capable of capturing an image of surroundings of the moving body 9 by 360°. The camera 7 supplies the thus captured image to the output control device 1C.

The microphone 8 is a microphone for obtaining audio generated in a real space surrounding the moving body 9. The microphone 8 can be a single microphone or a plurality of microphones. It is preferable that the single microphone 8 or the plurality of microphones 8 be capable of obtaining audio of surroundings of the moving body 9 by 360°. The microphone 8 supplies audio data of the audio thus obtained to the output control device 1C. In Embodiment 3, the "audio generated in a real space surrounding the moving body 9" will be hereinafter referred to as "ambient sound" in order to be distinguished from audio data 33. However, the ambient sound herein can include not only a sound made by a physical object but also all types of sound such as a speech voice of a person.

The output control device 1C obtains the captured image from the camera 7. The output control device 1C also obtains the ambient sound from the microphone 8. A spatial processing section 13 of the output control device 1C includes a display image preparing section 134. An audio output control section 15 of the output control device 1C includes an assignment determining section 153.

The display image preparing section 134 prepares an image to be displayed on each display 4 by synthesizing (i) the captured image from the camera 7 and (ii) an image in which a partial region of a virtual space or a part of an object(s) in the virtual space is drawn. Hereinafter, unless otherwise specified, the display image preparing section 134 carries out a process similar to those carried out by the display image preparing section 133 described in Embodiment 1 and the display image preparing section 133 described in Embodiment 2.

The assignment determining section 153 of the audio output control section 15 determines assignment of the ambient sound obtained from the microphone 8 as well as assignment of audio data 33. In a case where the output control system 300 includes no microphone 8, the assignment determining section 153 can carry out a processes similar to those carried out by the assignment determining section 153 in accordance with Embodiment 1 and the assignment determining section 153 in accordance with Embodiment 2.

In a case where the output control device 1C is connected to the foregoing vehicle interior camera and/or the vehicle interior sensor, the spatial processing section 13 of the output control device 1C can identify a position of the head of a passenger on the basis of an image captured by the vehicle interior camera and/or a result of measurement by the vehicle interior sensor.

(Preparation of Display Image)

The display image preparing section 134 cuts out, from the captured image obtained from the camera 7, a region to be displayed on each display 4. It is preferable that the region to be cut out from the captured image be determined by the display image preparing section 134 on the basis of the following (1) to (3).

(1) A real position and a real orientation (i.e., a traveling direction) of the moving body 9

(2) A position and an orientation of each display 4 in the real space (3) A size and a shape of each display 4

In a case where the spatial processing section 13 is capable of identifying a position of the head of a passenger, a region to be cut out from the captured image can be determined by the display image preparing section 134 on the basis of the position of the head of the passenger in addition to the above (1) to (3).

(Synthesis of Real Scenery and Scenery in Virtual Space)

The display image preparing section 134 prepares an image to be displayed on each display 4 by synthesizing (i) the image cut out from the captured image and (ii) an image of a partial region of the virtual space or a part of an object(s) in the virtual space. This enables the display image preparing section 134 to synthesize scenery in the real space and scenery or an object in the virtual space. In this case, a method for synthesizing the image cut out from the captured image and the image in the virtual space is not particularly limited. Further, there is no particular limitation to a ratio and a layout in which the image cut out from the captured image and the image in the virtual space are displayed.

In a specific example, the display image preparing section 134 can cut out from the captured image, for example, a region that would be seen from an inner space of the moving body 9 if each display 4 was a window. Then, an image thus cut out, i.e., an image of real scenery and a certain object in the virtual space can be synthesized, and an image thus obtained can be displayed.

By carrying out the above process, the output control system 300 can provide a passenger an illusion in which a part (in the above specific example, the certain object) of a virtual space appears in the real world. That is, the output control system 300 enables a passenger to experience augmented reality (AR). Further, in a case where the output control system 300 includes the microphone 8, the output control system 300 can output audio for representing a virtual space, together with ambient sound in the real world. Thus, the output control system 300 enables a passenger to experience augmented reality (AR).

Variation of Embodiment 3

Note that FIG. 9 illustrates, as an example, the output control system 300 obtained by combining the output control system 100 in accordance with Embodiment 1 with characteristic features of Embodiment 3. However, the output control system 300 can be a system which includes configurations of the output control system 200 in accordance with Embodiment 2 and which carries out also the process described in Embodiment 2.

Embodiment 4

In each of the above-described Embodiments 1 to 3, the positioning device 2 is a device included in the moving body 9. However, in each of the output control systems 100, 200, and 300, the positioning device 2 can be a device provided independently of the moving body 9.

For example, each of the positioning devices 2 described in Embodiments 1 to 3 can be an external camera provided in the vicinity of a road. The external camera captures an image of a moving body 9 traveling on the road. The external camera includes a communication function and is capable of communicating with the output control device 1A, 1B, or 1C. The output control device 1A, 1B, or 1C includes a communication section. The output control device 1A, 1B, or 1C communicates with the external camera in the vicinity of the road via the communication section to obtain the image captured by the external camera. Then, the position and orientation identifying section 11 identifies a real position and a real orientation of the moving body 9 on the basis of the image captured by the external camera and map data 34.

Further, for example, the positioning device 2 can be communication base stations provided in a scattered manner in a real space. In this case, the output control device 1A, 1B, or 1C includes a communication section and communicates with at least three of such communication base stations simultaneously. The position and orientation identifying section 11 identifies a real position of the moving body 9 on the basis of relative positional relationship between the communication base stations and the moving body 9. The position and orientation identifying section 11 identifies the real position a plurality of times as described above, and identifies a direction in which the real position has changed to be a traveling direction of the moving body 9, i.e., a real orientation of the moving body 9.

With the above configuration, even in a case where the moving body 9 does not include the positioning device 2, it is possible to identify a real position of the moving body 9 with use of information obtained from, for example, a monitoring camera, a base station, or the like. This makes it possible to reduce the number of components included in the moving body 9.

Software Implementation Example

Control blocks of each of the output control devices 1A, 1B, and 1C can be realized by a logic circuit (hardware) provided in an integrated circuit (IC chip) or the like or can be alternatively realized by software.

In the latter case, each of the output control devices 1A, 1B, and 1C includes a computer that executes instructions of a program that is software realizing the foregoing functions. The computer, for example, includes at least one processor and a computer-readable storage medium storing the program. An object of the present disclosure can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present disclosure can also be achieved in the form of a computer data signal in which the program is embodied via electronic transmission and which is embedded in a carrier wave.

The present disclosure is not limited to the embodiments, but can be altered by a skilled person in the art within the scope of the claims. The present disclosure also encompasses, in its technical scope, any embodiment derived by combining technical means disclosed in differing embodiments.

REFERENCE SIGNS LIST 100, 200, 300: output control system
1A, 1B, 1C: output control device
2: positioning device
3: storage device
4: display
5: speaker
6: vibrator
7: camera
8: microphone
9: moving body
11: position and orientation identifying section
12: reading section
13: spatial processing section
131: virtual position determining section
132: audio source determining section
133, 134: display image preparing section
14: display control section
15: audio output control section
151: playback section
152: stereo image control section
153: assignment determining section
16: vibration control section
31: virtual space data
32: audio source setting information
33: audio data
34: map data

The invention claimed is:
1. An output control device for controlling a display and a plurality of speakers, which are each provided in at least one of a plurality of side portions provided in an inner space of a moving body, comprising:
- a position and orientation identifying section configured to identify (i) a real position of the moving body, the real position being a position in a real space, and (ii) an orientation of the moving body in the real space;
- a reading section configured to read, from a storage device, virtual space data defining a virtual space in which an audio source object is provided in a three-dimensional map, the audio source object being a three-dimensional object that serves as a virtual audio source;
- a virtual position determining section configured to determine, in accordance with the real position of the moving body and the orientation of the moving body in the real space, (i) a virtual position of the moving body, the virtual position being a position in the virtual space, and (ii) an orientation of the moving body in the virtual space;
- a display control section configured to control the display to display, on the basis of (i) the virtual position of the moving body, (ii) the orientation of the moving body in the virtual space, and (iii) a position at which the display is provided, an image of a partial region of the virtual space or an image of a part of an object in the virtual space; and
- an audio output control section configured to control at least one of the plurality of speakers to output audio,
- the audio output control section controlling, on the basis of (i) the orientation of the moving body in the virtual space and (ii) a relative positional relationship between the virtual position of the moving body and the audio source object, a position of a stereo image formed by the audio outputted from the at least one of the plurality of speakers provided in at least one of the plurality of side portions provided in the inner space of the moving body.

2. The output control device as set forth in claim 1, wherein:
- the position and orientation identifying section periodically updates the real position of the moving body and the orientation of the moving body in the real space;
- the virtual position determining section updates, in accordance with the real position and the orientation in the real space thus updated, the virtual position and the orientation in the virtual space;
- the display control section controls the display to display the image of the partial region and the image of the part of the object, each of which has been updated on the basis of the virtual position and the orientation in the virtual space thus updated; and
- the audio output control section updates the position of the stereo image on the basis of the virtual position and the orientation in the virtual space thus updated.

3. The output control device as set forth in claim 1, wherein the audio output control section controls the at least one of the plurality of speakers so that the greater a distance between the virtual position and the audio source object in the virtual space, the smaller a volume in which audio corresponding to the audio source object is outputted.

4. The output control device as set forth in claim 1, wherein:
- the virtual position determining section determines the virtual position so that a positional relationship between a given reference point in the virtual space and the virtual position is similar to a positional relationship between a given reference point in the real space and the real position; and
- the image of the partial region or the image of the part of the object, each of which the display is controlled by the display control section to display, is determined so that the virtual space is displayed on the same scale as the real space.

5. The output control device as set forth in claim 1, wherein the output control device controls the display and the plurality of speakers, which are each provided in at least one of the plurality of side portions provided in the inner space of the moving body, to provide augmented reality.

6. The output control device as set forth in claim 1, wherein the output control device controls the display and the plurality of speakers, which are each provided in at least one of the plurality of side portions provided in the inner space of the moving body, to provide mixed reality.

7. The output control device as set forth in claim 1, wherein the moving body is a vehicle.

8. An output control system, comprising:
- an output control device recited in claim 1;
- a positioning device configured to measure data pertaining to the real position of the moving body;
- the storage device;
- the display; and
- the plurality of speakers,
- the position and orientation identifying section of the output control device identifying the real position of the moving body and the orientation of the moving body in the real space on the basis of the data pertaining to the real position and obtained from the positioning device.

9. A control method for controlling a display and a plurality of speakers which are each provided in at least one of a plurality of side portions provided in an inner space of a moving body, said method comprising:
- identifying (i) a real position of the moving body, the real position being a position in a real space, and (ii) an orientation of the moving body in the real space;
- reading, from a storage device, virtual space data defining a virtual space in which an audio source object is provided in a three-dimensional map, the audio source object being a three-dimensional object that serves as a virtual audio source;
- determining, in accordance with the real position of the moving body and the orientation of the moving body in the real space, (i) a virtual position of the moving body, the virtual position being a position in the virtual space, and (ii) an orientation of the moving body in the virtual space;
- controlling the display to display, on the basis of (i) the virtual position of the moving body, (ii) the orientation of the moving body in the virtual space, and (iii) a position at which the display is provided, an image of a partial region of the virtual space or an image of a part of an object in the virtual space; and controlling at least one of the plurality of speakers to output audio, on the basis of (i) the orientation of the moving body in the virtual space and (ii) a relative positional relationship between the virtual position of the moving body and the audio source object, a position of a stereo image formed by the audio outputted from the at least one of the plurality of speakers provided in at least one of the plurality of side portions provided in the inner space of the moving body.

10. The control method as set forth in claim 9, wherein the moving body is a vehicle.

* * * * *